(12) United States Patent
Boden et al.

(10) Patent No.: US 7,099,319 B2
(45) Date of Patent: Aug. 29, 2006

(54) VIRTUAL PRIVATE NETWORK AND TUNNEL GATEWAY WITH MULTIPLE OVERLAPPING, REMOTE SUBNETS

(75) Inventors: Edward B. Boden, Vestal, NY (US); Donald A. Palermo, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 10/055,690

(22) Filed: Jan. 23, 2002

(65) Prior Publication Data

US 2003/0145104 A1 Jul. 31, 2003

(51) Int. Cl.
*H04L 12/28* (2006.01)

(52) U.S. Cl. .................. 370/389; 370/392; 370/401
(58) Field of Classification Search ............ 370/401, 370/352, 353, 392, 475
See application file for complete search history.

(56) References Cited

U.S. PATENT DOCUMENTS

| | | | |
|---|---|---|---|
| 5,602,918 A | 2/1997 | Chen et al. ............... 380/21 |
| 5,627,824 A | 5/1997 | Arnold ..................... 370/396 |
| 5,864,666 A | 1/1999 | Shrader ................. 395/187.01 |
| 5,968,176 A | 10/1999 | Nessett et al. ............. 713/201 |
| 5,991,300 A | 11/1999 | Tappan ..................... 370/392 |
| 6,006,259 A | 12/1999 | Adelman et al. ........... 709/223 |
| 6,055,236 A | 4/2000 | Nessett et al. ............. 370/389 |
| 6,061,796 A | 5/2000 | Chen et al. ............... 713/201 |
| 6,078,957 A | 6/2000 | Adelman et al. ........... 709/224 |
| 6,081,900 A | 6/2000 | Subramaniam et al. ..... 713/201 |
| 6,105,027 A | 8/2000 | Schneider et al. ............. 707/9 |
| 6,130,892 A | 10/2000 | Short et al. ................. 370/401 |
| 6,154,839 A * | 11/2000 | Arrow et al. ............... 713/154 |
| 6,173,399 B1 | 1/2001 | Gilbrech .................... 713/153 |
| 6,178,505 B1 | 1/2001 | Schneider et al. .......... 713/168 |
| 6,182,226 B1 | 1/2001 | Reid et al. ................. 713/201 |
| 6,856,624 B1 * | 2/2005 | Magret ...................... 370/392 |
| 2003/0118002 A1 * | 6/2003 | Bradd et al. ............... 370/352 |
| 2003/0135578 A1 * | 7/2003 | Banga et al. ............... 709/215 |

OTHER PUBLICATIONS

Lee, Eun-Sang, et al. "An Expanded NAT with Server Connection Ability", *Proceedings of IEEE*, IEEE Region 10 Conference. TENCON 99. Multimedia Technology for Asia-Pacific Information Infrastructure. vol. 2, pp. 1391-1394.

(Continued)

*Primary Examiner*—Chau Nguyen
*Assistant Examiner*—Christopher Grey
(74) *Attorney, Agent, or Firm*—Shelley M. Beckstrand

(57) ABSTRACT

Local gateway support for multiple overlapping remote networks. The local gateway includes a pool of unique, internally routable system-wide addresses, an address bind table, a filter rules table, and a collection of security association databases. A plurality of overlapping connections are received at the local gateway from remote networks, each including an inbound packet having a source IP address. For each connection, the source IP address is bound with an address from the address pool in a bind table. Outbound packets are processed through the bind table to determine the destination IP address corresponding to a correct one of the plurality of overlapping connections.

21 Claims, 11 Drawing Sheets

OTHER PUBLICATIONS

Achemlal, M. et al. "Analysis of IPSEC Services and Their Integration in an IP Virtual Private Network". *Annales des Telecommunications*. Jul.-Aug. 2000, vol. 55, No. 7-8, pp. 313-323. INSPEC Abstract No. B2000-12-615OM-025, C2000-12-5640-020.

Umetsu, A. et al. "Security Router."Fujikura Giho, No. 98, pp. 19-23. INSPEC Abstract No. B2000-08-6210L-146, C2000-08-5630-006.

Hari, A. et al. "Detecting and Resolving Packet Filter Conflicts". *Proceedings IEEE INFOCOM 2000*. Conference on Computer Communications. Nineteenth Annual Joint Conference or the IEEE Computer and Communications Societies. vol. 3, pp. 12-3-1212. INSPEC Abstract No. B2000-05-6150P-027, C2000-05-5620W-056.

Buddhikot, M.M. et al. "Space Decomposition Techniques for Fast Layer-4 Switching". *Protocols for High-Speed Networks VI, Sixth International Workshop*. INSPEC Abstract No. B2000-02-6150C-020.

Gupta, V., et al. "Secure and Mobile Networking." *Mobile Networks and Applications*. vol. 3, No. 4, p. 381-90. INSPECT Abstract No. B1999-05-6210L-048, C1999-05-5620-012.

* cited by examiner

FIG. 6

VPN NAT ADDRESS BIND TABLE 58 — 59

| LOCAL/REMOTE INDICATOR | LHS_IP | RHS_IP | TIME_LAST_USED | VPN_CONNECTION_NAME |
|---|---|---|---|---|
| 62 | 64 | 66 | 68 | 70 |

FIG. 7

VPN FILTER RULES TABLE 72 — 76

| SOURCE IP | DEST IP | SOURCE PORT | DEST PORT | PROTOCOL | VPN CONNECTION NAME | ACTION |
|---|---|---|---|---|---|---|
| 82 | 84 | 86 | 88 | 90 | 92 | 94 |

VIRTUAL PRIVATE NETWORK AND TUNNEL GATEWAY WITH MULTIPLE OVERLAPPING, REMOTE SUBNETS

BACKGROUND OF THE INVENTION

1. Technical Field of the Invention

This invention pertains to security over virtual private network (VPN) connections. More particularly, it relates to gateway support for multiple overlapping remote networks.

2. Background Art

Virtual Private Networks (VPNs) are being increasingly deployed, over the existing Internet infrastructure, in support of B2B, supply chain logistics, and as a networking cost-reduction for an enterprise when communicating to its own branch offices. Typically, a business will organize its VPNs for a site or geographic area in a single VPN gateway. Each gateway will support many independent VPN connections from many remote systems, or remote gateways to smaller branch office networks, or suppliers (for example). The term "VPN connection" is another term referring to what is generally called an "IP Sec tunnel", the latter being defined in RFC2401.

A problem occurs when remote networks have IP addresses which overlap with each other. For example, assume company A has a VPN gateway and wants to set up two VPN connections, one with a supplier and another with a west coast branch office (of company A). Assume both the supplier network and the branch office network have a system with IP address 1.2.3.4. The extent of IP address overlap can, in general, range from a single IP address to entire subnets of hundreds of IP addresses. For this example, assume further that both supplier and branch office addresses are routable inside the network of company A. There are two problem aspects caused by overlap like this. First, packets distinction: if two 1.2.3.4 packets from the different 1.2.3.4 systems are both going to the same server in A's network, how can the server tell them apart? Second, tunnel determination: what does VPN gateway A do with the response packet with destination IP address of 1.2.3.4? That is, should it go to the supplier subnet, via the VPN connection to the supplier's VPN gateway or should it go to the branch office subnet via the VPN connection to the branch office gateway?

In special cases like the above, the problem is fairly simple to solve—in this case, since the branch office is part of network A, the administrators at the VPN gateway of network A might just ask the branch office to change the IP address of the 1.2.3.4 machine (once the problem is detected). Another possible solution would be to use network address translation (NAT) in either the supplier or the branch office network, prior to the supplier or branch office VPN gateway (before the traffic entered the VPN connection, because NAT cannot be applied to IPsec based VPN traffic).

But these solutions are unworkable in the general case. Consider that gateway A may need to set up VPN connections with scores of remote gateways, some not even known beforehand. Further, with the widespread use of designated private subnets (e.g. 10.*.*.*), collision opportunities are enhanced.

Another scenario which leads to the same problems is of a company with multiple remote locations, all known beforehand, where the I/S and network people would like to make each remote site identical (same number of systems, same OS's, same network, same application, same addresses) to ease configuration and system management of the remote sites. A general, scalable and realistically manageable solution needs to occur at the gateway A end of these VPN connections where gateway A does not know beforehand the IP address of the remote Internet Key Exchange (IKE) server, and must be largely automatic, needs to handle any arbitrary overlapping remote IP address sets with differing amounts of overlap, n-way overlap, etc. And, of course, the solution should not have to depend on after-the-fact detection of overlap, but rather should be able to handle overlap as it occurs.

All VPN scenarios that face the remote address overlap problem can be classified into two sets; set s1) those scenarios in which the remote VPN connection endpoint (remote IKE server) address is known ahead of time, and set s2) those scenarios in which the remote VPN connection endpoint is not known. A solution to the s1 class of scenarios is described in co-pending patent applications Ser. No. 09/240,720 filed Jan. 29, 1999 by E. B. Boden, et al. for System and Method for Network Address Translation Integration With IP Security; Ser. No. 09/595,950 filed Jun. 16, 2000 by E. B. Boden, et al. for System and Method for Network Address Translation Integration With IP Security; and Ser. No. 09/578,215 filed 23 May 2000 by E. B. Boden, et al. for System and Method for Network Address Translation Integration With IP Security. The s2 class of scenarios is solved by the current invention.

What makes the S2 scenarios different is this; since the remote IKE endpoint is unknown, there are two direct implications: first, the connections must be initiated remotely (hence the gateway of the local network is in 'responder mode'); and second, the gateway of the local network must have configured a VPN Policy with (logically) a destination IP address of 'any'. Therein lies the problem; within a given VPN policy VPN connections cannot overlap, but here a single VPN policy is exactly what is needed. The essential relationship here is one VPN connection filter is dynamically loaded for each VPN policy that successfully negotiates IKE Phase 2 Security Associations (SAs).

What does filtering have to do with VPN? Normally with IPsec (the underlying protocols of VPN), an outbound packet is filtered (run through a series of IP packet filters) to determine which VPN connection it belongs in (should be encapsulated in), if any. (This is true for all vendors' VPN implementations.) This is the heart of the problem; if two filters for the same VPN connection overlap, then the one which occurs first will match packets 'meant' for a later overlapping filter because early filters mask out traffic from later overlapping filters (in general). So, filter order matters ... but what is the right order? and how can the order be changed on a per packet basis?

This problem may exist for other TCP/IP tunneling scenarios, in addition to IPsec-based VPN's; for example, IPv6's 6to4 and 6over4, UDP tunneling (IPv4) through NAT, and others.

It is an object of the invention to provide an improved system and method for operating a local gateway in support of multiple overlapping remote networks.

It is an object of the invention to provide a system and method for a local network which allows communication with a plurality of overlapping remote networks.

It is an object of the invention to provide a system and method for overriding connection filters in order to support multiple overlapping remote networks.

It is an object of the invention to provide a system and method operating a local gateway in support of communications with multiple overlapping remote networks which requires no changes to those remote networks or the gateways to those remote networks.

It is an object of the invention to provide a system and method whereby multiple remote sites, even with overlapping addresses, may be configured using source-in NAT such that the traffic inside a local gateway is non-conflicting.

SUMMARY OF THE INVENTION

A system and method is provided for local gateway support for multiple overlapping remote networks. A plurality of overlapping connections are received at the local gateway from remote networks, each including an inbound packet having a source IP address. For each connection, the source IP address is bound with an internally routable and system-wide unique source IP address from an internal address pool in a bind table. Outbound packets are processed through the bind table to determine the destination IP address corresponding to correct one of the plurality of overlapping connections.

In accordance with an aspect of the invention, there is provided a computer program product configured to be operable to execute within a local gateway inbound and outbound connections with a plurality of remote gateways having overlapping addresses.

Other features and advantages of this invention will become apparent from the following detailed description of the presently preferred embodiment of the invention, taken in conjunction with the accompanying drawings.

BRIEF DESCRIPTION OF THE DRAWINGS

FIG. 6 is a schematic representation of a VPN NAT address bind table entry.

FIG. 7 is a schematic representation of a VPN filter table entry.

BEST MODE FOR CARRYING OUT THE INVENTION

Packet Distinction Using Network Address Translation (NAT)

Figure 1:
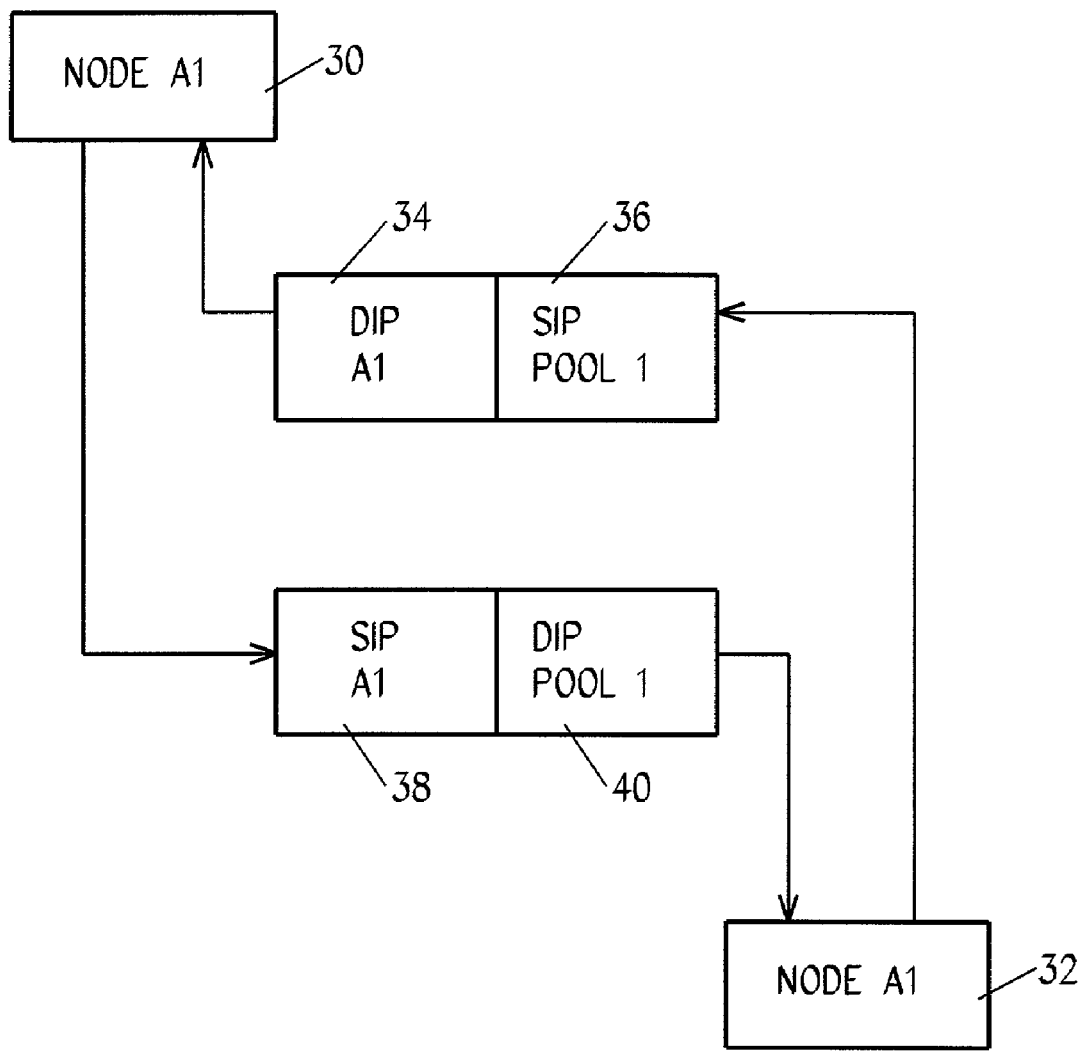
FIG. 1 is a schematic representation of destination and source IP address conversions.

Referring to FIG. 1, by convention, addressing of an exchange of packets between responder node A1 30 and source node B1 32 involves the use on the inbound packet of source IP address (sip) 36 and destination IP address (dip) 34, and on the outbound packet of sip 38 corresponding to dip 34 and dip 40 corresponding to sip 36.

Figure 2:
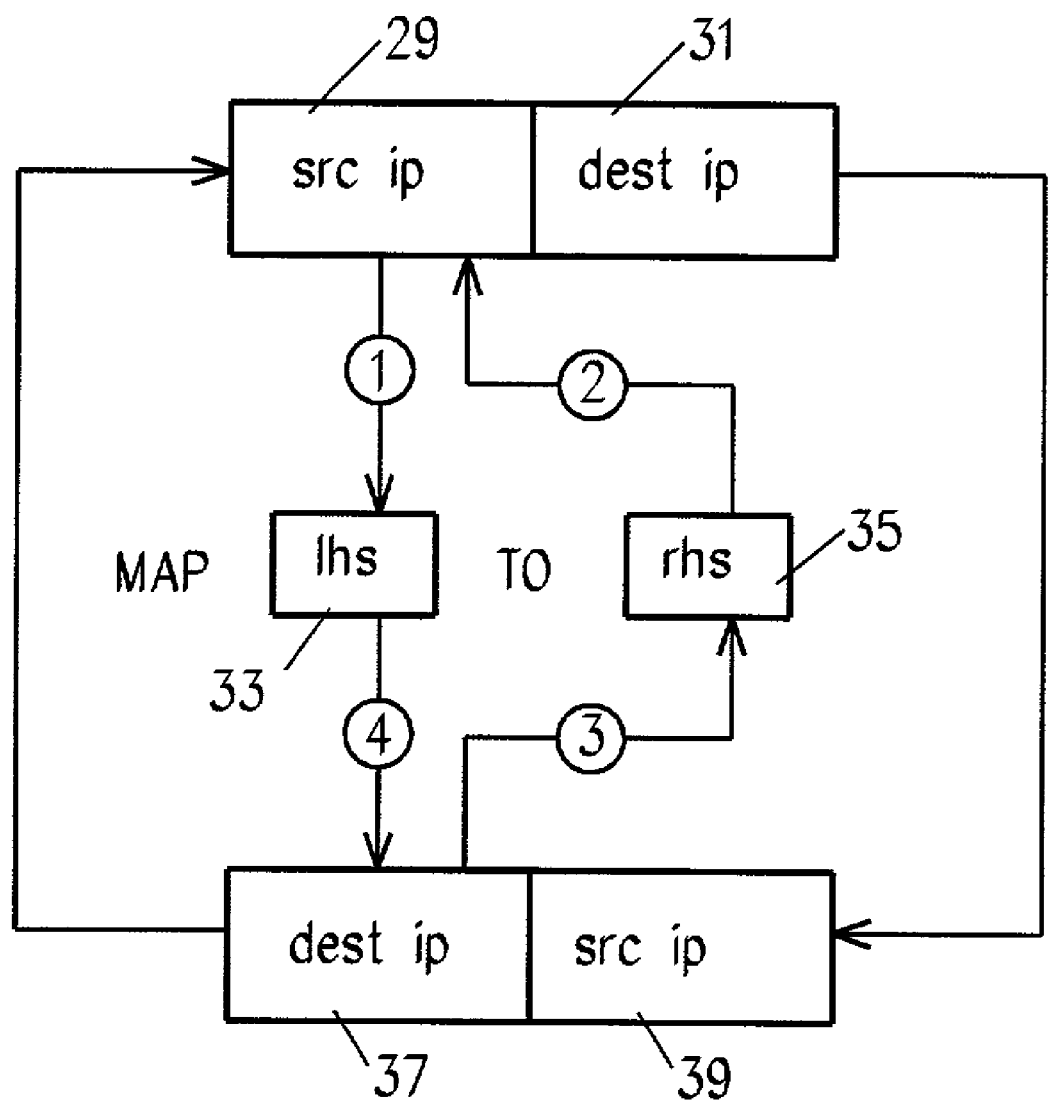
FIG. 2 is a schematic representation of static network address translation (NAT).

Referring to FIG. 2, static is the simplest form of network address translation (NAT). This NAT type is explicitly configured by the user by writing the corresponding NAT rule statements via an Operations Navigator graphical user interface (OpNav GUI). This is in contrast to the Internet protocol security (IPSec) NAT, in which the actual NAT rules or statements are generated by the system. The MAP statement <MAP lhs TO rhs> of FIG. 2 is such a user generated statement, where rhs signifies right-hand-side, and lhs left-hand-side.

On inbound processing, if source ip 29 matches lhs 33 in the MAP lhs TO rhs statement, then source IP address (also referred to as src ip, or sip) 29 is translated to rhs 35. On outbound processing, if destination ip 37 (also referred as dst ip, or dip) matches rhs 35, then destination ip 37 is translated to lhs 33.

Figure 3:
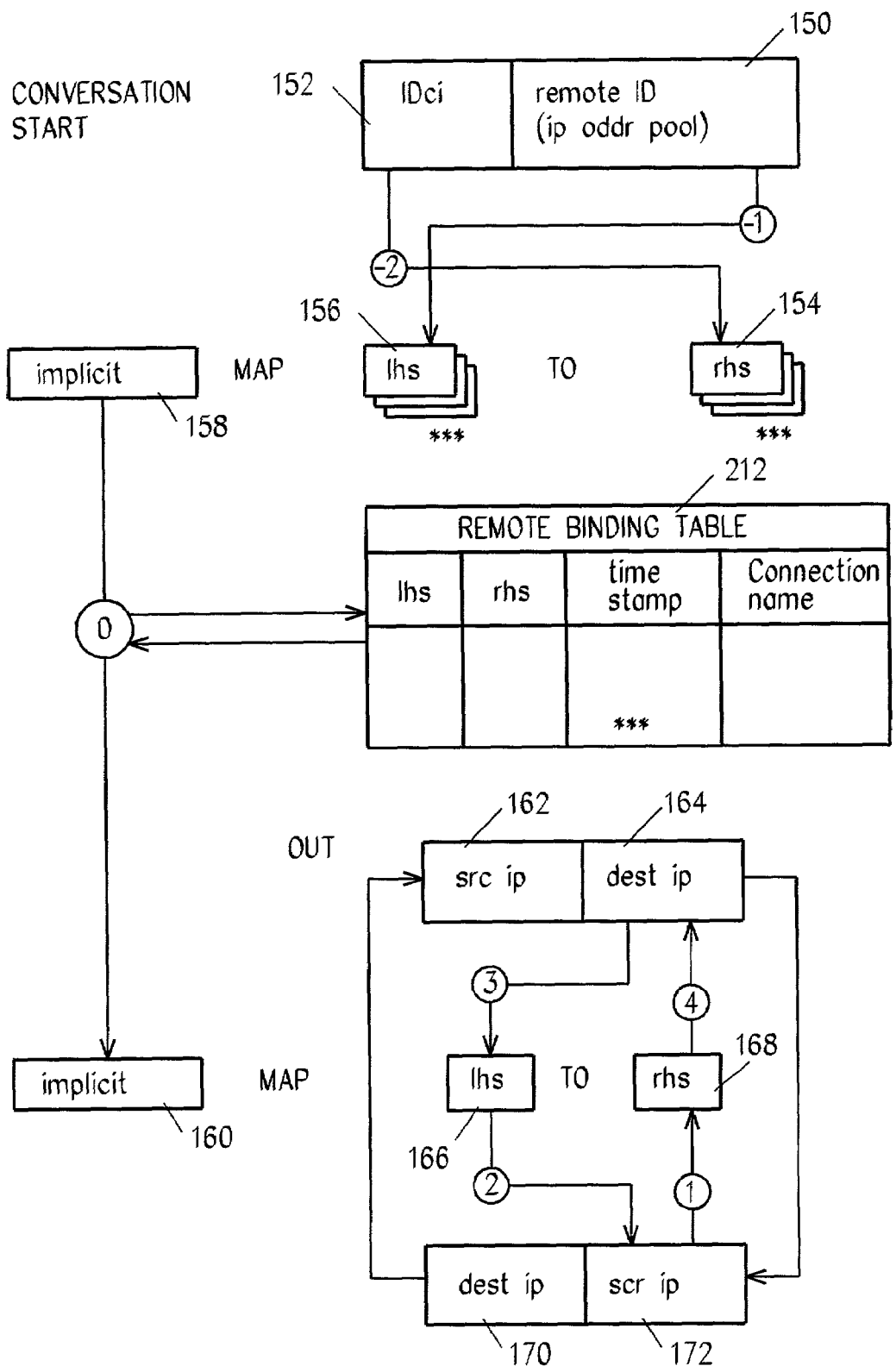
FIG. 3 illustrates virtual private network (VPN) NAT, type c (aka 'source-in'): IDci translated for responder-mode conversations.

Referring to FIG. 3, as is further described in co-pending application Ser. No. 09/578,215, VPN NAT 'c source-in' type starts a responder-mode connection as follows: in step <-2>, implicit MAP rule 158 <MAP ihs TO rhs>is created, by copying IDci 152 to rhs 154; and in step <-1>, by selecting ip address(es) from the appropriate pool 150 and copied to lhs 156. In step <0>, after IKE negotiation is complete using rhs 154, implicit rule 160 is loaded. This step <0> includes the following: In step <0>, after IKE negotiation is complete using rhs 154, implicit MAP rule 160 is loaded to the operating system kernel. This step <0> comprises the following steps; load the connection SA's, connection filter, and create blank version of table 212 with columns for lhs, rhs, use (that is, time stamp), and connection name. When processing inbound datagrams, if in step <1> src ip 172 matches a rhs 168, in step <2>, source ip 172 is translated to corresponding lhs 166. Then an entry may be made in the remote binding table 212. When processing outbound datagrams, if in step <3> destination IP 164 matches lhs 166, then in step <4> destination ip 164 is translated to rhs 168. The lookup for IP 164 used the remote binding table 212 or it uses the implicit MAP rule 160. This is further described in application Ser. No. 09/578,215.

Multiple Overlapping Networks

Figure 4:
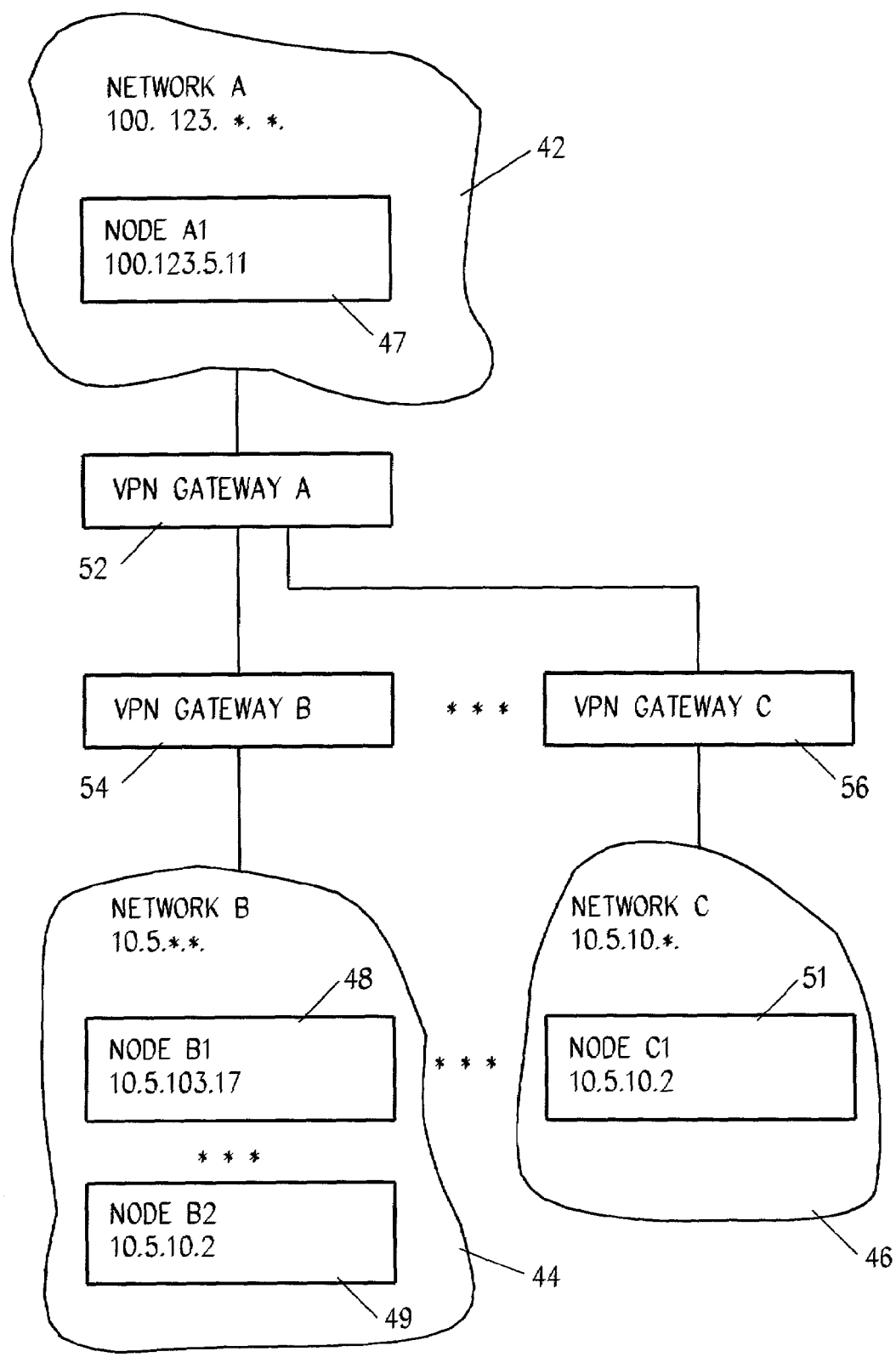
FIG. 4 is a schematic representation of multiple networks with overlapping IP addresses.

Referring to FIG. 4, an exemplary configuration of networks and nodes requiring support for multiple remote sites with overlapping networks works is illustrated. VPN gateway A 52 implements the invention. (Gateways B 54 and C 56 are entirely unimpacted by the invention.) All the gateways 52, 54 and 56 have globally routable (public) IP addresses. In this example, network B 44 and network C 46 have overlapping IP address ranges; network B has 10.5.0.0 through 10.5.255.255 and network C has 10.5.10.0 through 10.5.10.255. In particular, both network B 44 and network C 46 have node B2 49 and C1 51, respectively, with IP address 10.5.10.2.

Local VPN Gateway Configuration

Figure 5:
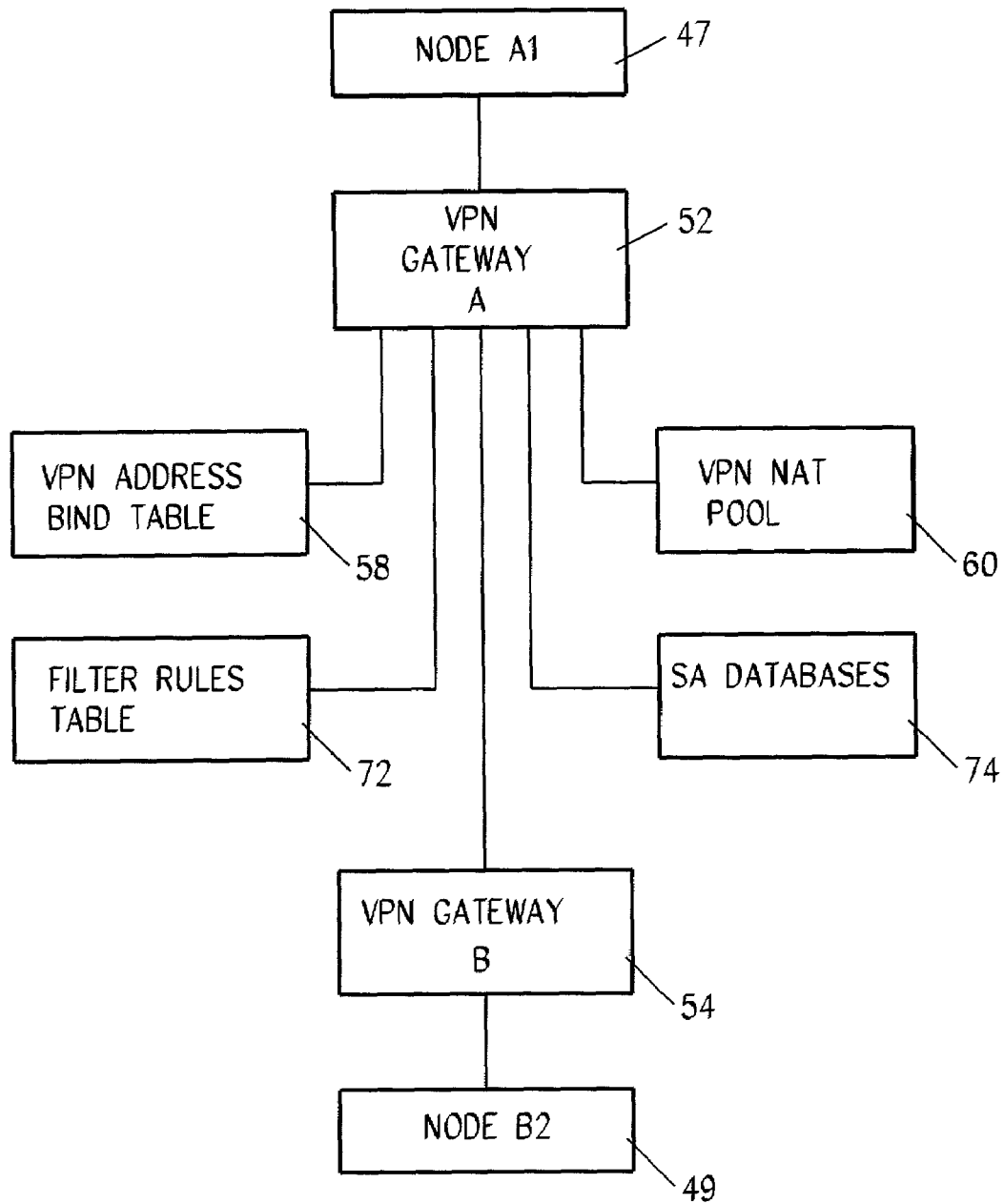
FIG. 5 illustrates the data objects managed by a gateway in accordance with the preferred embodiment of the invention.

Referring to FIG. 5, a local VPN gateway A 52 of the preferred embodiment of the invention comprises tables, databases and pools for tunnel identification in a system characterized by remote networks having overlapping addresses. Included in gateway 52 are VPN NAT pool 60, VPN address bind table 58, filter rules table 72, and security association (SA) databases 74.

Referring to FIG. 6, an entry 59 in VPN NAT address bind table 58 includes local/remote indicator field 62, left hand side (LHS) address field 64, right hand side (RHS) address field 66, time last used field 68, and VPN connection name field 70.

Referring to FIG. 7, a VPN filter rule 76 in filter rule table 72 includes sip 82, dip 84, source port 86, destination port 88, protocol ID 90, VPN connection name 92, and action 94. Actions 94 include deny, permit, and IP Sec required.

Figure 8:
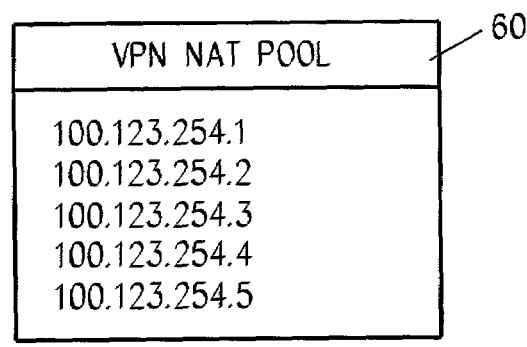
FIG. 8 is a schematic representation of VPN NAT address pool.

Referring to FIG. 8, VPN NAT pool 60 in gateway A 52 is depicted. This is a pool of IP addresses administratively reserved within the A network for use in the VPN NAT gateway 52 and are uniquely routable within network A 42. Shown are IP addresses 100.123.254.1 through 100.123.254.5.

Figure 9:
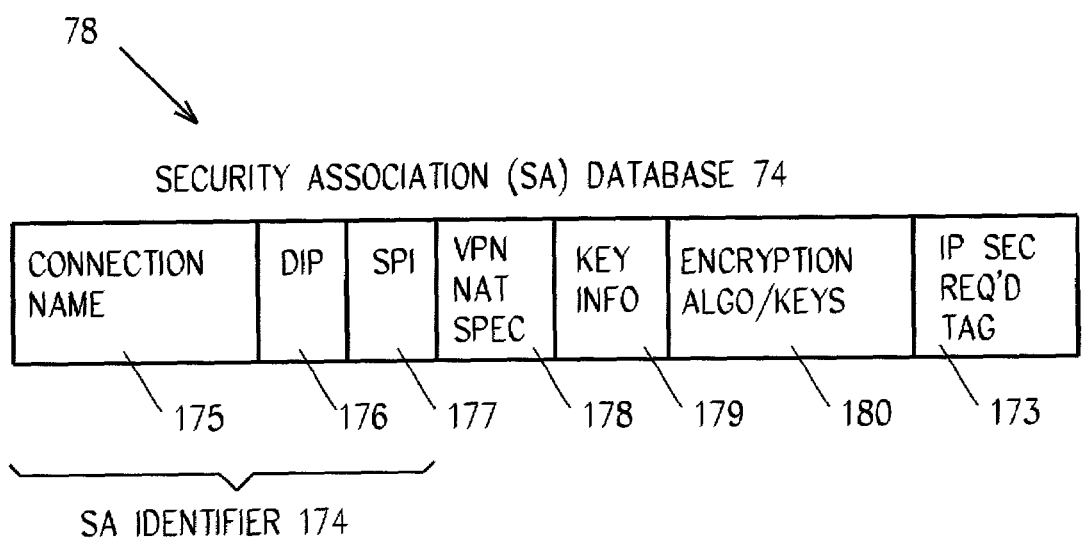
FIG. 9 is a schematic representation of a security association (SA) rule.

Referring to FIG. 9, a rule 78 in SA databases 74 includes an identifier 174 including connection name 175, dip 176, and security protocol index (spi) 177; VPN NAT specification 178, key information 179, encryption algorithm 180, and an IP SEC required tag 173.

Tunnel Identification by VPN NAT Filter Override

In accordance with the preferred embodiment of the method invention, the above described VPN NAT (which addresses the first problem aspect: "packet distinction") source-in type is exploited and enhanced to solve the second problem: "tunnel identification". Four parts e1–e4 of the invention are described hereafter. Part e1 concerns filter connection load, e2 concerns inbound traffic and e3, e4 deal with outbound traffic.

Figure 10:
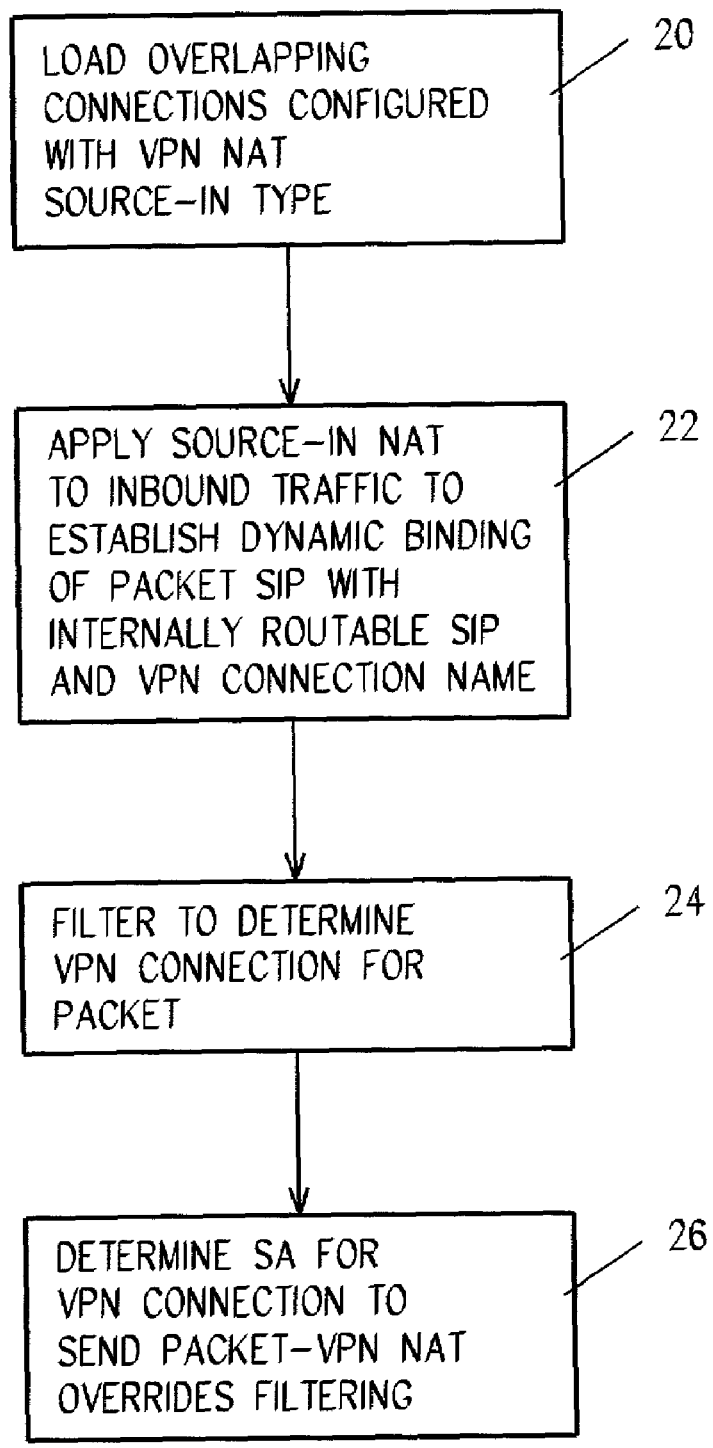
FIG. 10 is a high level flow chart representation of the basic steps of the method of the invention.

Referring to FIG. 10, this is done as follows:

e1) In step 20, load overlapping connections; multiple overlapping VPN connections are allowed to load, if they are configured with VPN NAT source-in type. The current invention uses source-in VPN NAT, and adds function to it, to achieve its objectives. Source-in VPN NAT has been described in connection with FIG. 3, drawing on the teaching of co-pending application Ser. No. 09/578,215.

e2) In step 22, source-in NAT saves connection name; VPN source-in NAT is applied to the inbound traffic, establishing dynamic binding of the packet source IP address (sip) with an internally routable and system-wide unique sip from an internal address pool, which is saved along with the VPN connection name. Here, VPN NAT is creating a dynamic NAT rule of the form 'map lhsdip to rhsdip', where lhsdip=pool IP address, and rhsdip=packet sip.

e3) In step 24, VPN NAT finds the real connection; filtering, as usual, determines which VPN connection should handle the packet. That is, filtering is used to determine that IPsec is necessary for the outbound (response) packet as usual; however, VPN NAT now makes an additional determination about which VPN connection the packet should go in based on the packets dip (destination IP address) and it's (VPN NAT's) internal tables and may determine that the VPN connection name is different than that determined by filtering, in which case e4) executes. If source-in VPN NAT was used the VPN NAT returns the connection name associated with the source NAT sip binding.

e4) In step 26, VPN NAT overrides filtering; after return from VPN NAT, the function to determine which specific IPsec Security Association (SA) is changed—instead of using the VPN connection from the filter (as usual), it now checks to see if VPN NAT returns a different VPN connection name. If so, the SA for that VPN connection is used to send the packet.

Thus, VPN NAT returns a VPN connection name to IPsec which overrides the VPN connection name originally obtained from filtering. That is, IPsec uses the filtering-derived SA, unless overridden by VPN NAT in which cases it uses that SA identified by the connection name from the VPN address bind table.

Solution elements e1 and e2 solve the first problem aspect "packet distinction", and elements e1, e3 and e4 solve the second problem aspect "tunnel identification" Although these elements involve VPN NAT, all four are new.

Figure 11:
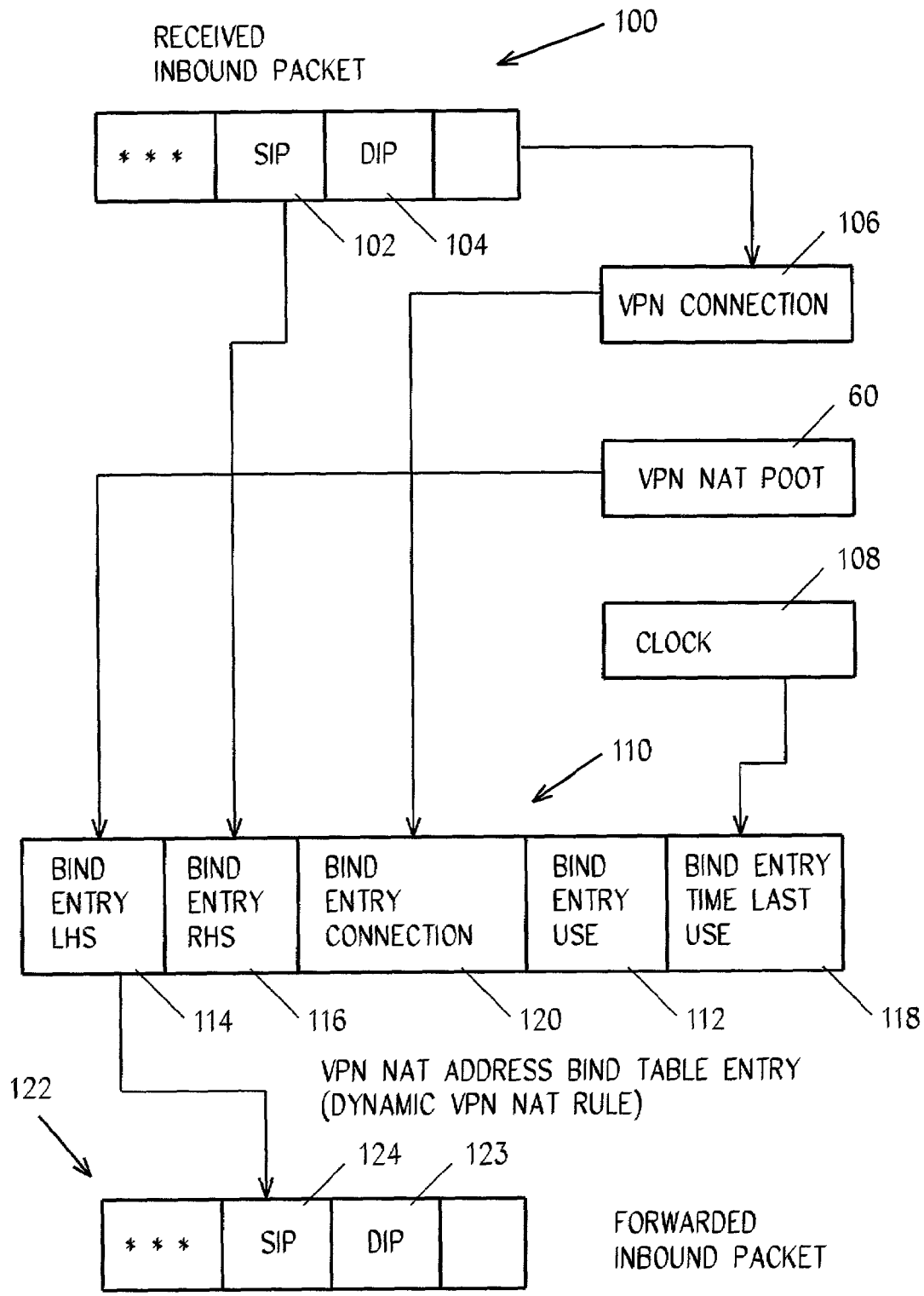
FIG. 11 is a schematic representation of inbound packet processing, steps e1 20 and e2 22 of the preferred embodiment of the invention.
Figure 12:
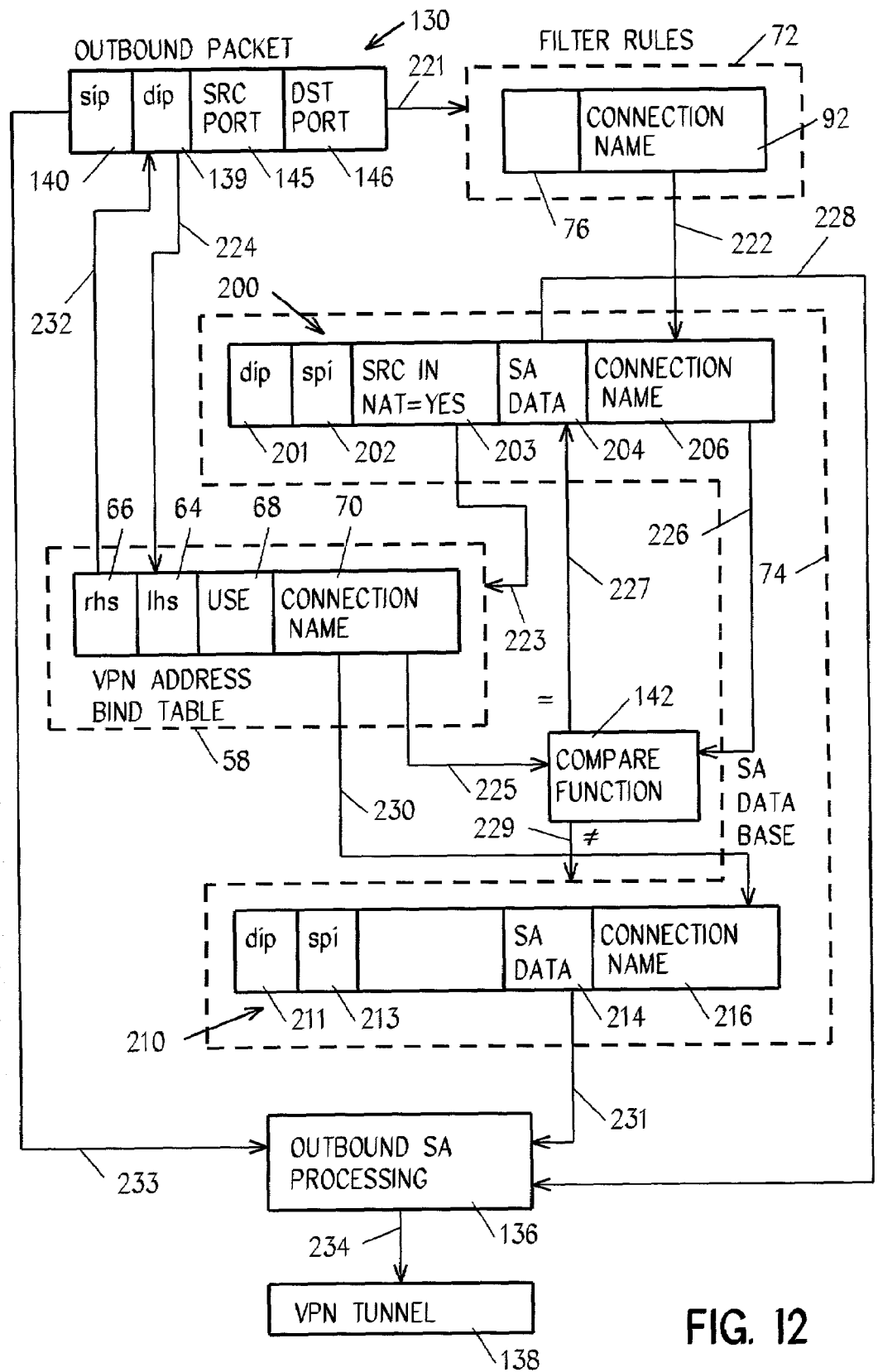
FIG. 12 is a schematic representation of outbound packet processing, steps e3 24 and e4 26 of the preferred embodiment of the invention.

Referring now to FIGS. 11 and 12, a more detailed description is provided of the system and method of the invention, as previous introduced with respect to phases e1–e4, steps 20, 22, 24 and 26, respectively.

On e1: Load Overlapping Connections

Heretofore, connection filters 76 have not been allowed to overlap, within a 'connection group' or 'connection definition'. Two filters 76 are overlapping if there can be any packets that would match both filters—defined another way; two filters 76 overlap if their order matters with respect to which is matched by packets. Since the order matters for overlapping filters, and that complicates VPN configuration, filters have previously not been allowed to overlap within a connection group so that the filters could be in any order, and the packets matched by the each filter would be the same. This is also a simplification because understanding a VPN configuration does not depend on connection filter order.

Hence the first problem: to support VPN connection with remote sites 49, 51 that have (or might have) overlapping IP addresses means that filters 76 that have (or can have) overlapping IP addresses exist. The reason for this is that the VPN connection filters 76 for each remote site must represent the data endpoints 82, 84 in that site in the filter, and to do this without requiring any extra configuration on the part of the customer. The solution is to detect connection overlap as usual, but if it is only an overlap of destination IP addresses 84 (dip, because VPN connection filters are always outbound only filters, hence the addresses of the remote data endpoints are dips) and the connection is configured for source-in NAT, then allow the connection filter to load.

The general, and most typical case, to which this invention applies, is when gateway 52 must support multiple remote sites 48, 49, 51, none of whose IP addresses are known ahead of time, including their VPN gateway 54, 56 IP addresses. So, the invention applies to remotely-initiated VPN connections (connections initiated at nodes 48, 49, 51 or the like). The filter rules of Table 1 show this situation (assume the local gateway network 42 is 100.123.*.*), a) before any remote sites 49 have established a connection to the local gateway 52, and b) after two remote sites 49, 51 have established connections to the local gateway 52.

TABLE 1

Filter Rules for Remotely-Initiated VPN Connections a) action = ipsec source_ip = 100.123.*.*　　dest_ip = * source_port = dest_port = *
Protocol = *　　　　　　　　connection_name = remoteinit: L0
direction = outbound b) action = ipsec source_ip = 100.123.*.*　　dest_ip = * source_port = dest_port = *
protocol = *　　　　　　　　connection_name = remoteinit: R2
direction = outbound TABLE 1-continued Filter Rules for Remotely-Initiated VPN Connections action = ipsec

| source_ip = 100.123.*.* | dest_ip = * source_port = dest_port = * |
| protocol = * | connection_name = remoteinit: R1 |
| direction = outbound | | action = ipsec

| source_ip = 100.123.*.* | dest_ip = * source_port = dest_port = * |
| protocol = * | connection_name = remoteinit: L0 |
| direction = outbound | |

These filters, like all VPN filters 59, are only for outbound traffic. The two connection filters (denoted by the fact that the connection name does not end in 'L0') are identical, except for the connection names; remoteinit:R1 and remoteinit:R2. Since the selectors are identical, they overlap.

The reason for requiring that the VPN connection be configured for source-in NAT is that this will change an inbound packet 100 sip 102 to an address selected from the source-in NAT address pool 60. This is a pool of addresses configured by the customer for the purpose of source-in NAT and they are, of course, unique and routable within the customer's network. Hence, when the inbound packet sip 102 is changed to one of these addresses, two purposes are served; a) that changed inbound packet sip 124 can no longer conflict with any address within the customer's network and b) it cannot conflict with any inbound packet 100 from some other remote site that might use the same addresses 102, 104. And since the inbound sip 122 becomes the outbound dip 139 (after an internal host responds to the packet), the packet 130 is routed by the gateway without problem.

So, a key aim and advantage of the invention is achieved; multiple remote sites 49, 51, even with overlapping addresses (in this example, 10.5.10.2), are allowed to be configured and their traffic inside the gateway is non-conflicting, due to source-in NAT.

The remaining hurdles to overcome now occur when a response packet 130 returns to the gateway 52. The direct result of allowing overlap is that now, when one of these outbound packets 130 matches one of these filters 76, 210 it may also have matched (many) other filters. And each of these connection filters 200, 210 has a different VPN connection name 206, 216. Which is the right VPN connection for the packet? The next three elements address this problem.

On e2: Source-in NAT Saves Connection Name

When an inbound IPsec'd packet 100 (a packet with an ESP or AH header following the IP header) is successfully decapsulated (means the AH or ESP (or both) headers are successfully processed and removed, including a tunnel IP header if it exists), it is checked to determine if VPN NAT (destination-in or source-in) is necessary. If source-in is required, then a table-lookup is done in the VPN NAT Address bind table 58 to see if an entry 110 already exists for this packet 100; that is, a table entry with 'right-hand-side' (rhs) 116 equal to the packet sip 102. If an entry 110 is found, source-in NAT is done by changing the packet's inbound sip 102 to the entry lhs 114.

Table 2 illustrates a VPN NAT address bind table 58 including a series of any number of address bind entries.

TABLE 2

Example VPN NAT Address Bind Table

| L/R indicator 62 | LHS_ip 64 | RHS_ip 66 | time_last_used 68 | VPN_connection_name 70 |
|---|---|---|---|---|
| 1 remote | 1.2.3.4 | 10.1.2.3 | 11:23:07.451 | remoteinit: R1 |
| 2 remote | 1.2.3.5 | 10.22.4.5 | 10:57:03.008 | remoteinit: R2 |
| 3 remote | 1.2.3.6 | 10.1.2.3 | 10:47:17.581 | remoteinit: R3 |
| 4 . . . | | | | |

(This comes from a convention for expressing NAT rules. The convention has the form 'lhs ip->rhs ip', which reads, 'change lhs ip to rhs ip', can apply to either sip or dip, and is always from the perspective of an outbound packet. The implicit corresponding NAT rule for the inbound packet is 'lhs ip<-rhs ip', which can also apply to the sip or dip.)

In accordance with the present invention, new function is provided for responding when a table 58 entry is not found. In that case, a new entry 59 is created for this first inbound packet 100 (it must be the first packet, else there would be a address bind entry 59 already) from the VPN connection. The entry is created with these values;

bindentry.lhs 114=unused address from the VPN NAT pool 60.

bindentry.rhs 116=packet sip 102.

bindentry.connection 120=name of the VPN connection 106 that just successfully decapsulated the packet 100.

bindentry.use 112=remote nat.

bindentry.time_last_use 118=current time 108.

So, this creates a dynamic VPN NAT rule 110. And the rule has the VPN connection name 120 to which the rule applies. (This new rule is used in e3 and e4.)

Then the newly created VPN NAT rule 110 is applied to the packet 100 (identically to the case above, where the rule had already existed) to create forwarded inbound packet 122. The packet 122 is then sent on, now with a source address 124 the cannot conflict with any in the internal network, nor any from other remote VPN-connected sites 51.

On e3: VPN NAT Finds the Real Connection

After processing by some node 47 in the internal network 42, the return packet 130 is routed back to the gateway 52 based on the dip 139 (which was the sip 102 in the inbound packet 100). As is represented by line 221, at gateway 52, filtering is performed as usual. Filtering finds a matching filter 76 with a connection name 92 whose SA's 200 show that source-in NAT is required 203. (If the connection filter 76 is one for a VPN connection 106 that has any other overlapping VPN connection filter 76, then this filter, and all other overlapping filter must have source-in VPN NAT 203 configured to "yes", because they were not allowed to be loaded unless source-in VPN NAT was configured (see e1).)

If filtering matches on a non-VPN connection filter (with either PERMIT or DENY action 94) then the packet is not IPsec'd and the question of which tunnel is irrelevant, If filtering matches on a VPN connection filter that does not have source-in NAT 203 equal to "yes", then the packet 130 is IPsec'd, as usual per that connection SA 200, and it is the right VPN connection (by definition).)

As is represented by line 223, the VPN NAT function is called with the packet 130 and does a table lookup in the VPN NAT address bind table 58, looking for an entry such that entry::lhs 64 equals the packet dip 139 (which is the address obtained from the VPN NAT pool 60 on inbound, see FIG. 10). The entry 59 created on the first inbound is found, and as is represented by line 232, VPN NAT is done by changing the dip 232 to the entry::rhs 66. Then, as represented by line 225, the connection name 70 in the entry is returned to the caller.

On e4: VPN NAT Overrides Filtering

Upon return from VPN NAT, a check is made by compare function 142 to see if the connection name 92, 206 in the filter 76 is different from the connection name 70 returned by VPN NAT from bind table 58. If they are different, as is represented by line 229, the connection name 70 returned by VPN NAT is used to IPsec the packet 130 (hence, put the packet in the correct VPN tunnel 138). More specifically, the connection name 70 returned by VPN NAT is used to find the outbound SA 210 for the that connection, and the outbound SA 210 is used to perform, as is represented by outbound SA processing 136, IPsec on the packet 130. (It can happen that the connection name 70 returned by VPN NAT is the same as the connection name in the VPN connection filter 92, in which case, it can be said the VPN NAT connection is still used to IPsec 136 the packet 130.)

By way of summary of the operation of the preferred embodiment of the invention, with reference to FIG. 11, as is represented by line 221, filter rules 72 are searched for a rule 76. As is represented by line 222, the connection name 92 from the matching rule 76 is used to select filter derived SA 200. As is represented by line 223, if the derived SA 200 has source-in NAT=yes, then as is represented by line 224, VPN address bind table 58 is searched for an entry having lhs 64 equal to dip 139. If found, as is represented by line 225, the connection name 70 for the matching entry in bind table 58 is returned and as represented by line 232 the dip 139 is set to rhs 66. As is represented by lines 225 and 226, connection names 70 and 92 are compared and, if equal, as is represented by lines 227 and 228, the SA data 204 is used to process in 136 outbound packet 130 into VPN tunnel 138. As is represented by line 229, if connection names 70 and 92 do not compare equal, then connection name 70 is used to search SA database 74 for an entry 210 with matching connection name 216, and as is represented by line 231 the SA data 214 from entry 210 is used to process outbound packet 130 into VPN tunnel 138. In this later case, the SA 210 based on connection name 70 VPN address bind table 58 overrides the filter derived SA 200.

This is new function provided by the present invention, where the connection filter 76 is overridden. But, given that these filters overlap (which filter is matched depends on the filter order) it follows that it may have matched the 'wrong' filter, from the perspective of a given packet 130. VPN NAT 'remembers' which VPN tunnel the packet 130 came in and uniquely 'marks' the first and all successive packets via it source-in NAT 203. Hence VPN NAT decides which VPN tunnel is the correct one for outbound packets 130 that have an entry in the VPN NAT address bind table 58.

Referring to Table 3 in connection with Table 13, using the invention in gateway A 52, process steps are described for establishing two concurrent VPN connections which allow network B node 49 (10.5.10.2) to communicate with node A1 47 and network C node 51 (10.5.10.2) to communicate with node A1 47.

Note 1: the two remote nodes 49, 51 could be communicating with any nodes in network A 42, any two different nodes, including the gateway 52 itself—the example just happens to show them both communicating with the same node 47.

Note 2: the address domain of network A 42 could also be overlapping with one or both (or any) of the remote sites 48, 49, 51 it is communicating with. For example, in FIG. 4, the A network 42 address space could be 10.*.*.* which overlaps both networks B 44 and C 46. The current invention handles this situation. The additional implication when the local network 42 overlaps the remote network 44, 46 is that a node 47 in network A 42 to which the remote node 49 sends the first packet must be addressable. The basic way to achieve this is to give node 47 a global IP address (in addition to its 10.*.*.* address). The global alternate address can be configured in the node 47, or the gateway 52 can use destination-in VPN NAT to map the global address to an internal 10.*.*.* address. (Destination-in VPN NAT is outside the scope of this invention—see the co-pending applications referenced above.)

Note 3: the example shows just two conflicting remote sites 49, 51—the invention supports any number of such remote sites. The number of concurrently supportable connections in a given implementation depends upon the number of addresses in the VPN NAT address pool 60.

TABLE 3

Example 1: B:10.5.10.2 to A1, and return

| Step | Action |
|---|---|
| 181. | Node B1 (10.5.10.2) sends packet to node A1 (100.123.5.11). |
| 182. | Gateway B 54 initiates VPN connection with gateway A 52. |
| 183. | VPN connection between gateways B 54 and A 52 established (as usual). |
| 184. | Gateway B 54 sends B:10.5.10.2 packet 100 in the VPN connection. |
| 185. | Gateway A 52 successfully decapsulates the inbound packet 100. |
| 186. | Gateway A 52 determines that source-in VPN NAT should be done and that no existing address bind 100 exists. |
| 187. | Gateway A 52 chooses VPN pool 60 address 100.123.254.5 and creates address binding 59 {100.123.254.5, 10.5.10.2, remoteinit: R1}, which signifies lhs 64 equals 100.123.254.5, rhs 66 equals 10.5.10.2, and connection name 70 equals remoteinit: R1. |
| 188. | Gateway 52 changes the packet source IP 102 to lhs 114 100.123.254.5 and forwards it (packet 122) to node A1 47 (100.123.5.11). |
| 189. | Node A1 47 (100.123.5.11) responds and sends packet 130 with source ip 140 = 100.123.5.11, dest ip 139 = 100.123.254.5. |
| 190. | Routing network A routes this packet 130 to gateway A 52. |
| 191. | In gateway A 52, filtering matches connection filter 76 for connection name 92 equal to remoteinit: R1, the SA 200 for which has source-in VPN NAT 203 = yes. |
| 192. | VPN NAT find the address binding entry 59 in bind table 58 (step 187) matching on dip 139 of 100.123.254.5, and changes the dest ip 139 to rhs 66 (10.5.10.2). |
| 193. | VPN NAT returns remoteinit: R1 connection name 70. |
| 194. | Gateway A 52 IPsec's the outbound packet 130, using the return VPN connection name 70 (which matches the connection filter name 92, 206). |
| | The rest of the packet processing back through gateway B 54, decapsulated from IPsec, to B:10.5.10.2 is as usual. |

Table 4 summarizes packet source & destination IP address changes for B:10.5.10.2<->A1 packets. These outbound packets are tunneled in VPN connection remoteinit:R1, hence the 10.5.10.2 dip is not a problem.

TABLE 4

Packet Source & Destination IP Address Changes for B:10.5.10.2 <-> A1 Packets

|  | before source-in VPN NAT | after source-in VPN NAT |
|---|---|---|
| Inbound | sip: 10.5.10.2<br>dip: 100.123.5.11 | sip: 100.123.254.5<br>dip: 100.123.5.11 |
| Outbound | sip: 100.123.5.11<br>dip: 100.123.254.5<br>(source-in NAT changes the dip 139 on outbound) | sip: 100.123.5.11<br>dip: 10.5.10.2 |

EXAMPLE 2

C:10.5.10.2 to A1, and Return

Figure 13:
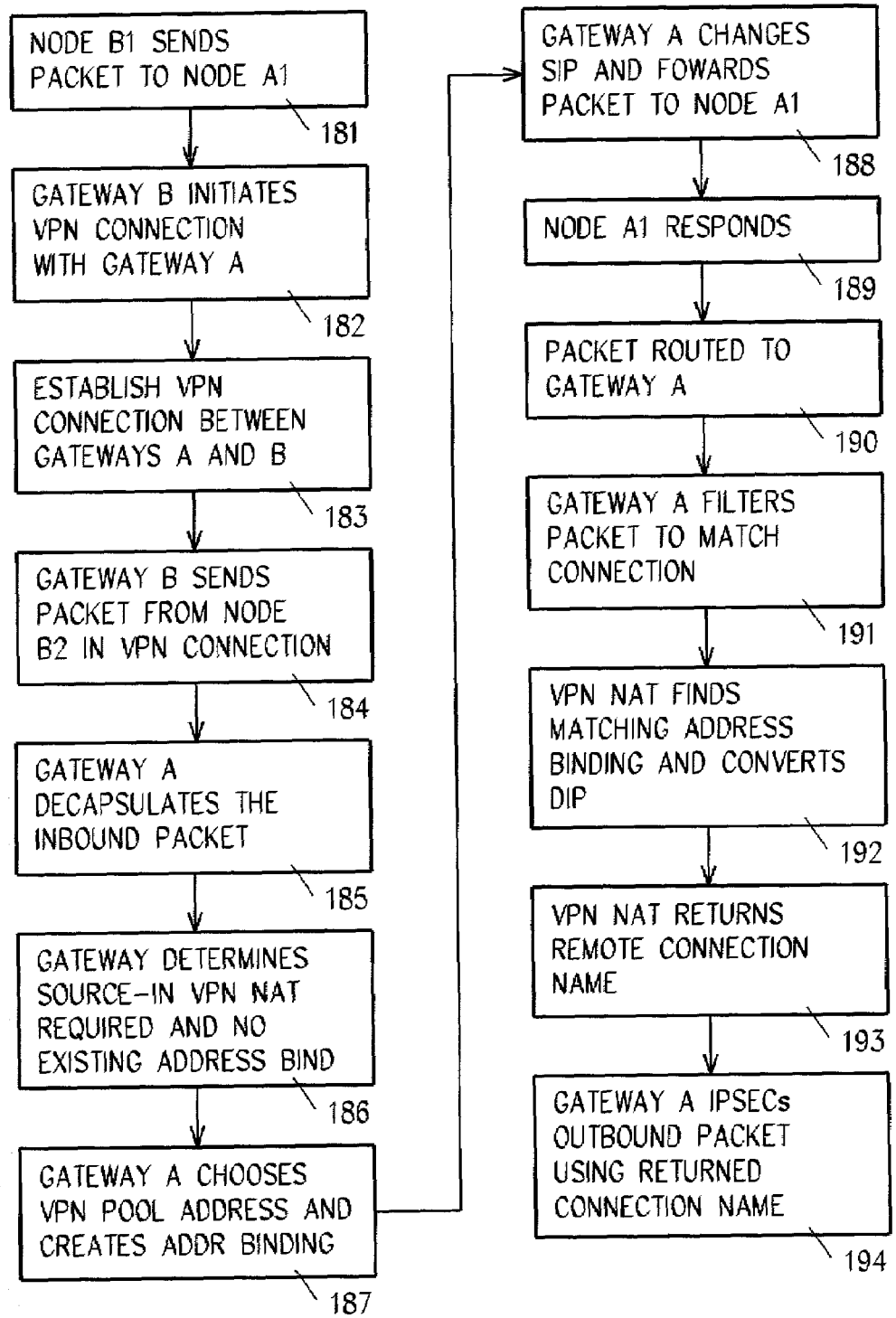
FIG. 13 is a flow chart illustrating a more detailed, exemplary embodiment of the method of the invention.

Referring to Table 5 in connection with FIG. 13, the steps are the same as above for Table 3, except for step 187 (choosing a VPN NAT pool address), 188 & 192 (actual NAT rule applied), and 193 (determining the correct VPN connection).

TABLE 5

Example 2: C:10.5.10.2 to A1, and return

| Step | Action |
|---|---|
| 181. | C:10.5.10.2 sends packet to 100.123.5.11 |
| 182. | Gateway C initiates VPN connection with gateway A |
| 183. | VPN connection between C and A established (as usual) |
| 184. | Gateway sends C:10.5.10.2 packet in the VPN connection |
| 185. | Gateway A successfully decapsulates the inbound packet |
| 186. | Gateway A determines that source-in VPN NAT should be done and that no existing address bind exists. |
| 187. | Gateway A chooses VPN pool address 100.123.254.4 and creates address binding {100.123.254.4, 10.5.10.2, remoteinit: R2} |
| 188. | Gateway changes the packet source IP to 100.123.254.5 and forwards it to 100.123.5.11 |
| 189. | Node 100.123.5.11 responds and sends packet with source ip = 100.123.5.11, dest ip = 100.123.254.4. |
| 190. | Routing network A route this packet to gateway A |
| 191. | In gateway, filtering matches connection filter for remoteinit: R1, which has source-in VPN NAT. |
| 192. | VPN NAT find the address binding (step 187) matching on 100.123.254.4, and changes the dest ip to 10.5.10.2. |
| 193. | VPN NAT returns remoteinit: R2 connection name. |
| 194. | Gateway A IPsec's the outbound, using returned VPN connection name (which does not match the filter connection name). |
| 195. | The rest of the packet processing back through gateway B, decapsulate from IPsec, to B:10.5.10.2 is as usual. |

Table 5 summarizes packet source & destination IP address 140, 139,respectively, changes for C:10.5.10.2<-> A1 packets.

TABLE 5

Packet Source and Destination IP Address Changes for C:10.5.10.2 <-> A1 Packets

|  | before source-in VPN NAT | after source-in VPN NAT |
|---|---|---|
| Inbound | sip: 10.5.10.2<br>dip: 100.123.5.11 | sip: 100.123.254.4<br>dip: 100.123.5.11 |
| Outbound | sip: 100.123.5.11<br>dip: 100.123.254.4<br>(source-in NAT changes the dip 139 on outbound) | sip: 100.123.5.11<br>dip: 10.5.10.2 |

These outbound packets are tunneled in VPN connection remoteinit:R2 (which is different than the tunnel used for packets to network B 44), hence the 10.5.10.2 dip is not a problem.

ADVANTAGES OVER THE PRIOR ART

It is an advantage of the invention that there is provided an improved system and method for operating a local gateway in support of multiple overlapping remote networks.

It is an advantage of the invention that there is provided a system and method for a local network which allows communication with a plurality of overlapping remote networks.

It is an advantage of the invention that there is provided a system and method for overriding connection filters in order to support multiple overlapping remote networks.

It is an advantage of the invention that there is provided a system and method operating a local gateway in support of communications with multiple overlapping remote networks which requires no changes to those remote networks or the gateways to those remote networks.

It is an advantage of the invention that there is provided a system and method whereby multiple remote sites, even with overlapping addresses, may be configured using source-in NAT such that the traffic inside a local gateway is non-conflicting.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for providing local gateway support for multiple overlapping remote networks, comprising the steps of:
   loading a plurality of overlapping connections, each including an inbound packet having a source IP address;
   for each said connection, binding said source IP address in a bind table with an internally routable and system-wide unique source IP address from an internal address pool;
   network address translating outbound packets, each said outbound packet having a destination IP address, to determine a virtual private network connection for receiving said outbound packet;
   filtering said outbound packet to determine a first connection name;
   determining from said bind table a second connection name;
   responsive to said first and second connection names comparing equal, processing said outbound packet into a VPN tunnel using a security association database determined by said first connection name; and
   responsive to said first and second connection names comparing not equal, processing said outbound packet into a VPN tunnel using a security association database determined by said second connection name.

2. A local gateway system, comprising:
   an address pool for storing a plurality of internally routable and system wide, nonconflicting network addresses;
   an address bind table for binding a conflicting source address from an inbound packet from a remote network to a connection name and to a unique network address from said address pool;
   a filter rules table responsive to an outbound packet for determining a first connection indicia;
   said address bind table further responsive to said outbound packet f or determining a second connection indicia; and
   said local gateway system being responsive to said first and second connection indicia comparing equal for processing said outbound packet to a communications tunnel using a first security association determined by said first connection indicia, and responsive to said first and second connection indicia comparing not equal for processing said outbound packet to a communications tunnel using a second security association determined by said second connection indicia.

3. A program storage device readable by a machine, tangibly embodying a program of instructions executable by a machine to perform method steps for providing local gateway support for multiple overlapping remote networks, said method steps comprising:
   loading a plurality of overlapping connections, each including an inbound packet having a source IP address;
   for each said connection, binding said source IP address in a bind table with an internally routable and system-wide unique source IP address from an internal address pool;
   network address translating outbound packets, each said outbound packet having a destination IP address, to determine a virtual private network connection for receiving said outbound packet;
   filtering said outbound packet to determine a first connection name;
   determining from said bind table a second connection name;
   responsive to said first and second connection names comparing equal, processing said outbound packet into a VPN tunnel using a security association database determined by said first connection name; and
   responsive to said first and second connection names comparing not equal, processing said outbound packet into a VPN tunnel using a security association database determined by said second connection name.

4. A local gateway system for processing inbound and outbound packets with respect to a local network and a plurality of remote nodes having potentially overlapping addresses, comprising:
   an address pool component;
   an address bind table component;
   a filter rules table component;
   a security association component;
   an entry in said address bind table component including a left hand side (LRS) address field, a right hand side (RHS) address field, and first connection name field;
   an entry in said filter rules table component including source IP address (sip), destination IP address (dip), source port, destination port, second connection name, and action field;
   said address pool component including a pool of sip addresses administratively reserved and uniquely routable within said local network;
   a security association in said security association component including third connection name and security association data;
   first logic responsive to an inbound packet for dynamically binding in said address bind table component the inbound packet sip with a local sip selected from said address pool component and first connection indicia;
   second logic responsive to an outbound packet for accessing said filter rules table component to determine filter derived connection indicia;
   third logic responsive to said outbound packet for accessing said address bind table component to determine corresponding bind table derived connection indicia; and
   fourth logic responsive to said filter derived connection indicia and said bind table derived connection indicia comparing equal for accessing said security association component to select security association data corresponding to said filter derived connection data for processing said outbound packet, and responsive to said filter derived connection indicia and said bind table derived connection indicia comparing not equal for accessing said security association component to select security association data corresponding to said bind table derived connection indicia for processing said outbound packet.

5. The local gateway system of claim 4, further comprising:
   said action field selectively containing deny, permit, and IP Sec required indicia; and
   said second logic being responsive to said outbound packet corresponding to a filter having an action field containing said IP Sec required indicia for initiating execution of said third logic.

6. A method for operating a local gateway, comprising the steps of:
  receiving an inbound racket on a network connection from a remote node;
  applying source-in network address translation to establish dynamic binding of the source IP address of said inbound packet with an internally routable and system wide unique source-in IP address and a connection name;
  receiving an outbound packet from an internal node;
  filtering said outbound packet to determine a first connection;
  selectively determining a second connection from a connection name bound to said unique source-in IP address corresponding to the destination-out IP address of said outbound packet; and
  selectively overriding said first connection by said second connection.

7. The method of claim 6, further comprising the step of:
  tunneling said outbound packet to said remote node responsive to security association data selectively corresponding to said first connection or said second connection.

8. The method of claim 7, further comprising the step of:
  overriding said first connection by said second connection responsive to said first connection and said second connection comparing not equal.

9. A program storage device readable by a machine, tangibly embodying a program of instructions executable by a machine to perform method steps for providing local gateway support for multiple overlapping remote networks, said method steps comprising:
  receiving an inbound packet on a network connection from a remote node;
  applying source-in network address translation to establish dynamic binding of the source IP address of said inbound packet with an internally routable and system wide unique source-in IP address and a connection name;
  receiving an outbound packet from an internal node;
  filtering said outbound packet to determine a first connection;
  selectively determining a second connection from a connection name bound to said unique source-in IP address corresponding to the destination-out IP address of said outbound packet; and
  selectively overriding said first connection by said second connection.

10. The program storage device of claim 9, said method steps further comprising:
  tunneling said outbound packet to said remote node responsive to security association data selectively corresponding to said first connection or said second connection.

11. The program storage device of claim 10, said method steps further comprising:
  overriding said first connection by said second connection responsive to said first connection and said second connection comparing not equal.

12. A communication method, comprising the steps of:
  operating a remote gateway to initiate a connection with a local gateway;
  sending from a remote node at said remote gateway an inbound packet addressed by a destination address to a local node at said local gateway and a remote node source address identifying said remote node;
  operating said local gateway to decapsulate said inbound packet;
  operating said local gateway to determine that said inbound packet requires source-in network address translation and that no existing address bind exists for said inbound packet;
  operating said local gateway to choose a pool address and create a binding table entry binding said remote node source address to said pool address and a unique connection name;
  replacing said remote node source address with said pool address and forwarding said inbound packet to said local node;
  receiving at said local gateway an outbound packet having as its destination address said pool address;
  filtering said outbound packet to identify corresponding connection indicia;
  finding in said binding table an entry corresponding to said outbound packet, converting said destination address to said remote node source address, and returning said unique connection name;
  responsive to said unique connection name, selecting security association data; and
  responsive to said security association data, tunneling said outbound packet to said remote node.

13. The method of claim 12, said remote node being one of a plurality of remote nodes having overlapping addresses.

14. The method of claim 13, further comprising the steps of:
  comparing said corresponding connection indicia and said unique connection name; and
  responsive to said corresponding connection indicia and said unique connection name comparing equal, selecting security association data corresponding to said corresponding connection indicia.

15. A method for operating a local gateway for controlling communication between a local node and a remote node. comprising the steps of:
  receiving an inbound packet on a network connection from a remote node, said inbound packet characterized by a first source address identifying said remote node and a first destination address identifying said local node; applying source-in network address translation to establish dynamic binding of said first source address with an internally routable and system wide unique second source address and a first connection name; and
  establishing said dynamic binding by creating a binding entry in an address bind table with a bind entry left hand side set equal to said second source address selected from a local address pool, a bind entry right hand side set equal to said first source address, and said first connection name.

16. The method of claim 15, further comprising the steps of:
  receiving from said local node an outgoing packet intended for said remote node and having identifying indicia including a second destination address;
  filtering said outgoing packet to find a filter rule having a second connection name associated with said identifying indicia;
  responsive to said second connection name, identifying a filter derived security association;
  responsive to said filter rule requiring source-in network address translation, searching said address bind table for a matching binding entry having a bind entry left hand side corresponding to said second destination address, and setting said second destination address equal to said bind entry right hand side;

responsive to said first connection name selected from said matching binding entry, identifying a binding table derived security association; and selectively responsive to said filter derived security association or said binding table derived security association, processing said outbound packet into a tunnel for communication to said remote node.

17. The method of claim 16, further comprising the steps of:

responsive to said first connection name selected from said matching binding entry and said second connection name comparing not equal, selecting said binding table derived security association for processing said outbound packet.

18. A program storage device readable by a machine, tangibly embodying a program of instructions executable by a machine to perform method steps for providing local gateway support for multiple overlapping remote networks, said method steps comprising:

operating a remote gateway to initiate a connection with a local gateway;

sending from a remote node at said remote gateway an inbound packet addressed by a destination address to said local node at said local gateway and a remote node source address identifying said remote node;

operating said local gateway to decapsulate said inbound packet;

operating said local gateway to determine that said inbound packet requires source-in network address translation and that no existing address bind exists for said inbound packet;

operating said local gateway to choose a pool address and create a binding table entry binding said remote node source address to said pool address and a unique connection name;

replacing said remote node source address with said pool address and forwarding said inbound packet to said local node;

receiving at said local gateway an outbound packet having as its destination address said pool address;

filtering said outbound packet to identify corresponding connection indicia;

finding in said binding table an entry corresponding to said outbound packet, converting said destination address to said remote node source address, and returning said unique connection name;

responsive to said unique connection name, selecting security association data; and responsive to said security association data, tunneling said outbound packet to said remote node.

19. A program storage device readable by a machine, tangibly embodying a responsive to said security association data, tunneling said outbound packet to said remote node. program of instructions executable by a machine to perform method steps for providing local gateway support for multiple overlapping remote networks, said method steps comprising:

receiving an inbound racket on a network connection from a remote node, said inbound racket characterized by a first source address identifying said remote node and a first destination address identifying said local node;

applying source-in network address translation to establish dynamic binding of said first source address with an internally routable and system wide unique second source address and a first connection name; and establishing said dynamic binding by creating a binding entry in an address bind table with a bind entry left hand side set equal to said second source address selected from a local address pool, a bind entry right hand side set equal to said first source address, and said first connection name.

20. The program storage device of claim 19, said method steps further comprising:

receiving from said local node an outgoing packet intended for said remote node and having identifying indicia including a second destination address;

filtering said outgoing packet to find a filter rule having a second connection name associated with said identifying indicia;

responsive to said second connection name, identifying filter derived security association;

responsive to said filter rule requiring source-in network address translation, searching said address bind table for a matching binding entry having a bind entry left hand side corresponding to said second destination address, and setting said second destination address equal to said bind entry right hand side;

responsive to said first connection name selected from said matching binding entry, identifying a binding table derived security association; and selectively responsive to said filter derived security association or said binding table derived security association, processing said outbound packet into a tunnel for communication to said remote node.

21. The program storage device of claim 20, said method steps further comprising:

responsive to said first connection name selected from said matching binding entry and said second connection name comparing not equal, selecting said binding table derived security association for processing said outbound packet.

\* \* \* \* \*